July 14, 1964     J. W. STRANGE     3,140,831

TRANS-ILLUMINATED PANELS

Filed Dec. 20, 1955

INVENTOR
John Wm. Strange

BY
Hall & Houghton

ATTORNEY

United States Patent Office 3,140,831
Patented July 14, 1964

3,140,831
TRANS-ILLUMINATED PANELS
John William Strange, 105–109 Judd St.,
London W.C. 1, England
Filed Dec. 20, 1955, Ser. No. 554,329
Claims priority, application Great Britain Jan. 11, 1955
6 Claims. (Cl. 240—8.16)

The present invention relates to trans-illuminated panels, such as are used, for example, as instrument panels in aircraft.

Such panels are made of a clear, transparent material, such as that sold under the registered trademark "Perspex" and usually have on their front surface a reflective layer of white plastic material covered by a layer of a black plastic material. The black material is chosen to have a low reflectivity and a high resistance to wear. The back surface of the panel is usually covered with white or black paint according to requirements.

For the purpose of illuminating such a panel there are usually provided one or more pea lamps supported by suitable holders in apertures formed in the panel and suitable wiring is provided for conveying the required current to the one or more lamp holders. In some cases a metal plate has been provided on the back of the panel to serve as a ground, only one connecting wire to each lamp holder being then needed.

It is the principal object of the present invention to provide a trans-illuminated panel which is cheaper to construct than known panels, and also stock material of novel construction from which such panels can be made.

According to the present invention there is provided as a new article of manufacture suitable for use as a trans-illuminated panel, a laminated structure including at least a clear transparent layer, a layer of high reflectivity and an outer layer of low reflectivity, in the order named, and an electrically conducting layer located between two other of the layers of the structure, the whole structure being rigidly bonded together. A metal backing plate may be subsequently applied to the panel to act as the second terminal of an electric supply to one or more lamps, or, alternatively, the structure may comprise two metal layers insulated from one another by one or more of the other layers, which are preferably of plastic insulating material, the whole being rigidly bonded together. One or both of the metal layers may be perforated in order to facilitate adhesion.

The present invention also provides a trans-illuminated panel of a structure as set forth in the preceding paragraph, the panel having formed therein at least one aperture adapted to accommodate an electric lamp with its terminals in electrical contact with the electrically conducting layer and the backing plate, or with the two electrically conducting layers, respectively, and in a position to emit light into the clear, transparent layer, and the invention further comprises the combinaiton of such panel with a lamp holder in each aperture electrically fed through the electrically conducting layer interposed between the laminations.

The invention will be described, by way of example, with reference to the accompanying drawing in which.

Figure 1:
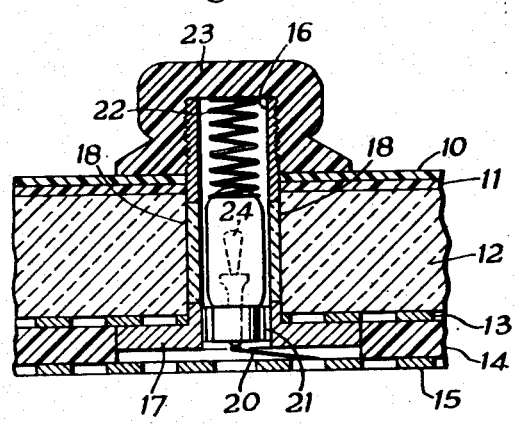
FIG. 1 is a view in cross-section of one embodiment of the invention.

Referring to FIG. 1, there is shown a panel in the form of a laminated structure comprising, in the order named from front to back, and rigidly bonded together, a layer 10 of black plastic (of low reflectivity), a first layer 11 of white plastic (of high reflectivity), a layer 12 of clear, transparent plastic, a first perforated metal layer 13, a second layer 14 of white plastic and a second perforated metal layer 15. Into an aperture in the panel is fitted a tubular lamp holder 16 having a flange 17 at one end and threaded at the opposite end. The lamp holder is provided with suitable windows 18 through which light can be emitted into the clear transparent layer 12, and the windows may if desired, and as shown, be fitted with light-transmitting materials which may be in the form of light filters of suitable color.

The back of the panel is counterbored around the aperture accommodating the lamp holder 16 to admit the flange 17 of the lamp holder, this flange thus engaging the first metal layer 13. The thickness of the second white layer 14 is greater than the thickness of the flange so that the flange is out of contact with the second metal layer 15.

A lamp is inserted into the lamp holder from the front of the panel and its center contact terminal engages a blade spring 20 fixed to the second metal layer 15. The outside of the lamp cap, which constitutes the other terminal of the lamp, is arranged by means of a suitable spring sleeve 21 to make electrical contact with the lamp holder 16. The lamp is held in position by means of a coil spring 22 which bears against its front end and against the inside of a screw cap 23 which is screwed over the front end of the lamp holder and serves to draw the flange into firm engagement with the second metal layer.

When the lamp is positioned as shown its filament 24 is arranged to be opposite the windows 18 in the lamp holder and in the medial plane of the clear transparent layer 12 which can, therefore, be efficiently trans-illuminated thereby.

Any desired number of apertures furnished, as described, with lamp holders may be provided in the panel. A suitable source of power supply for the lamps may be connected to the two metal layers through contact strips connected with these layers along one or more edges of the panel.

Other combinations of laminations can of course be used. For instance the second metal layer 15 can be omitted and its place can be taken by a metal backing plate carrying blade springs positioned to engage the contacts of the lamps, the backing plate being fixed to the panel 10, 11, 12, 13 and 14 in any convenient way. In this case the backing plate does not require to be apertured.

Figure 2:
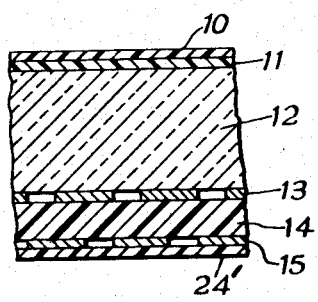
FIG. 2 shows a modification of the panel in FIG. 1.

As shown in FIG. 2 the second metal layer 15 may be covered by a further layer 24' of white plastic.

Figure 3:
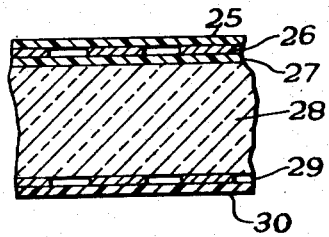
FIG. 3 shows a further form of panel according to the invention.

Another convenient panel structure shown in FIG. 3 comprises, in the order named from front to back, a layer of black plastic 25, a metal layer 26, a layer 27 of white plastic, a layer 28 of clear, transparent plastic which is to be trans-illuminated, a second metal layer 29, and a second layer 30 of white plastic.

I claim:

1. A trans-illuminated panel sub-assembly comprising an apertured laminated structure and a lamp holder in said aperture, said structure comprising a plurality of layers rigidly bonded together, said layers including a clear transparent layer, a layer of high reflectivity and an outer layer of low reflectivity, in the order named, and at least one other layer, at least said one other layer and a layer juxtaposed thereto being electrically insulating, an opaque electrically conducting metallic layer located between said electrically insulating other layer and said electrically insulating layer juxtaposed thereto, and said lamp holder comprising an electrically conductive portion bearing against said metallic layer, said sub-assembly further comprising another electrically conductive member lying in a plane spaced from the plane of said metallic layer and separated therefrom by said insulating other layer and constituting a second conductor for completing a circuit of a lamp adapted to be held in said lamp holder.

2. A trans-illuminated panel sub-assembly comprising an apertured laminated structure and a flanged lamp holder extending through said aperture, said structure comprising a plurality of layers rigidly bonded together, said layers including at least an insulating layer, a clear transparent layer, a layer of high reflectivity and an outer layer of low reflectivity, in the order named, and an opaque electrically conducting metallic layer located between said insulating layer and said clear transparent layer, said insulating layer being apertured to accommodate the flange of said lamp holder, and said flange being electrically conductive and bearing against said metallic layer, said sub-assembly further comprising another electrically conductive member lying in a plane spaced from the plane of said metallic layer and separated therefrom by said insulating layer and constituting a second conductor for completing a circuit of a lamp adapted to be held in said lamp holder.

3. A trans-illuminated panel assembly comprising an apertured laminated structure and a flanged lamp holder extending through said aperture, and constituted to accommodate a lamp having a lamp cap in electrical contact with said lamp holder and a center contact, said structure comprising in the order named, a clear transparent layer, a first metal layer, an electrically insulating layer, and a second metal layer, said electrically insulating layer being apertured to accommodate the flange of said lamp holder, said flange being electrically conducting and bearing on said first metal layer and lying out of contact with said second metal layer, and said second metal layer having a portion thereof positioned to make electrical contact with said center contact of said lamp.

4. A panel comprising: a light transmitting sheet, a translucent sheet affixed on one side thereof, an electrically conductive sheet affixed on said translucent sheet and an opaque covering on said electrically conductive sheet.

5. A panel comprising a light transmitting sheet, a translucent sheet affixed thereto, an opaque material of contrasting color covering all of said translucent sheet except the portion to be illuminated upon entry of light rays into said light transmitting sheet, and an electrically conductive element between said translucent sheet and said opaque material.

6. A panel comprising: a light transmitting sheet, a translucent sheet affixed thereto, an opaque material of contrasting color covering all of said translucent sheet except the portion to be illuminated upon entry of light rays into said light transmitting sheet, an electrically conductive element between said translucent sheet and said opaque material and a second electrically conductive element on the opposite side of said translucent sheet from said first mentioned electrically conductive element and insulated therefrom.

References Cited in the file of this patent
UNITED STATES PATENTS

| | | |
|---|---|---|
| 2,518,726 | Shlenker | Aug. 15, 1950 |
| 2,587,568 | Eisler | Feb. 26, 1952 |
| 2,599,710 | Hathaway | June 10, 1952 |
| 2,695,354 | Neugass | Nov. 23, 1954 |
| 2,696,550 | Neugass | Dec. 7, 1954 |
| 2,702,340 | Thieblot | Feb. 15, 1955 |
| 2,772,651 | Amico | Dec. 4, 1956 |
| 2,824,954 | Roper | Feb. 25, 1958 |